(12) United States Patent
Flynn

(10) Patent No.: US 11,307,334 B2
(45) Date of Patent: Apr. 19, 2022

(54) DEEP VIEW DISPLAY SCREEN

(71) Applicant: InnerScene Limited, Quedgeley (GB)

(72) Inventor: Sean Flynn, Quedgeley (GB)

(73) Assignee: InnerScene Limited, Gloucestershire (GB)

(*) Notice: Subject to any disclaimer, the term of this patent is extended or adjusted under 35 U.S.C. 154(b) by 0 days.

(21) Appl. No.: 17/263,123

(22) PCT Filed: Jul. 26, 2019

(86) PCT No.: PCT/GB2019/052095
§ 371 (c)(1),
(2) Date: Jan. 25, 2021

(87) PCT Pub. No.: WO2020/021277
PCT Pub. Date: Jan. 30, 2020

(65) Prior Publication Data
US 2021/0191248 A1 Jun. 24, 2021

(30) Foreign Application Priority Data
Jul. 26, 2018 (GB) ...................................... 1812219

(51) Int. Cl.
*G03B 21/28* (2006.01)
*G02B 5/04* (2006.01)
(Continued)

(52) U.S. Cl.
CPC ............. *G02B 5/045* (2013.01); *G02B 30/26* (2020.01); *G03B 21/006* (2013.01); *G03B 21/28* (2013.01); *G03B 21/60* (2013.01); *G03B 35/24* (2013.01)

(58) Field of Classification Search
CPC .... G03B 21/006; G03B 21/008; G03B 21/28; G03B 2/60; G03B 21/602; G03B 21/62; G03B 35/18; G03B 35/20; G03B 35/22; G03B 35/24; G02B 5/04; G02B 5/045; G02B 5/0808; G02B 5/0816; G02B 5/0875
See application file for complete search history.

(56) References Cited

U.S. PATENT DOCUMENTS 4,653,875 A 3/1987 Hines
8,068,285 B1 11/2011 Flynn
(Continued)

*Primary Examiner* — Sultan Chowdhury
(74) *Attorney, Agent, or Firm* — Umberg Zipser LLP; Ryan Dean

(57) ABSTRACT

The present invention describes an image display apparatus for directing an image towards an observer. The apparatus comprises a source of image point rays; a collimating device configured to collimate image point rays to produce collimated image rays; and, a prism sheet configured to receive the collimated image rays. The prism sheet comprises an array of micro-prisms, each micro-prism having two reflective facets arranged such that each collimated image ray is reflected off one facet and then an adjacent facet. Reflection from the second facet reorients the collimated image rays towards an image observation zone. The collimated image rays from an upper portion of the prism sheet converge with collimated image rays from a lower portion of the prism sheet within the image observation zone. The present invention also describes a method for directing an image towards an observer.

20 Claims, 11 Drawing Sheets

(51) Int. Cl.
*G03B 21/00* (2006.01)
*G03B 21/60* (2014.01)
*G03B 35/24* (2021.01)
*G02B 30/26* (2020.01)

(56) References Cited

U.S. PATENT DOCUMENTS

| | | | | |
|---|---|---|---|---|
| 2002/0080615 | A1* | 6/2002 | Marshall | G02B 3/00 |
| | | | | 362/333 |
| 2012/0051049 | A1* | 3/2012 | Huang | G02B 27/0961 |
| | | | | 362/235 |
| 2012/0224062 | A1* | 9/2012 | Lacoste | G02B 27/01 |
| | | | | 348/148 |
| 2013/0135749 | A1* | 5/2013 | Akutsu | G02B 17/02 |
| | | | | 359/633 |
| 2016/0363777 | A1* | 12/2016 | Flynn | G02B 30/33 |
| 2018/0164671 | A1* | 6/2018 | Kinoshita | G03B 21/14 |
| 2018/0172995 | A1* | 6/2018 | Lee | G02B 6/0035 |
| 2018/0341118 | A1* | 11/2018 | Roberts | G02B 27/0101 |

\* cited by examiner

DEEP VIEW DISPLAY SCREEN

FIELD OF INVENTION

This invention relates to a display apparatus for providing distant views as if the displayed images were on or near the horizon.

BACKGROUND TO THE INVENTION

When images undergo collimation, it is a general rule that the larger the collimated display area, the deeper the collimating apparatus needs to be. This can make it difficult to view a collimated image in a depth restricted space e.g. when mounting the apparatus to a wall such that it functions as a virtual window i.e. an infinity display.

U.S. Pat. No. 4,653,875 discloses a "pancake" display, which compresses the optic path using catadioptric optics, quarter wave retarders and polarised surfaces, in order to minimise the depth of the optical apparatus. However, in this system optical losses are very high as typically only 2% of the light emitted from the display's image generating device is transmitted to an observer.

The Applicant's own U.S. Pat. No. 8,068,285 provides an infinity display device with autostereoscopic capabilities. It describes a display system comprising a waveguide which receives a narrow (but wider than is typical of interpupillary distances) contiguous array of collimated images such that their collective, collimated beams are directed into the waveguide's pupil aperture. These images are gradually uncoupled and redirected toward the viewer using a gradient reflective mirror and prismatic sheet. However, although this system is compact, there are difficulties in manufacturing a gradient reflective mirror, such that parallelism between the mirror and a corresponding fully reflective mirror is maintained. If parallelism is not maintained, the images can lose registration and ghost images can be created. In a closed waveguide form, uncoupling totally internally reflected light in a controlled manner can also be challenging.

Other waveguide designs also exist whereby rays are not gradually uncoupled but are instead redirected out of the guide upon first encountering an uncoupling feature, such as a diffraction grating or micro-prism array, which constitute the viewing zone. However, in such cases waveguide thickness dictates the size of the exit aperture (viewing zone) restricting it to head mounted devices.

Embodiments of the present invention therefore aim to provide a display apparatus which overcomes at least some of the above mentioned disadvantages. For example, an object is to provide a relatively unobtrusive and compact wall-mounted display apparatus capable of displaying images at or near the horizon, which is easier to manufacture and assemble.

SUMMARY OF THE INVENTION

Accordingly, in a first aspect, the present invention provides an image display apparatus for directing an image towards an observer, the apparatus comprising:
 a source of image point rays;
 a collimating device configured to collimate image point rays to produce collimated image rays; and,
 a prism sheet configured to receive the collimated image rays; the prism sheet comprising an array of micro-prisms, each micro-prism having two reflective facets arranged such that each collimated image ray is reflected off one facet and then an adjacent facet;
 wherein reflection from the second facet reorients the collimated image rays towards an image observation zone; and,
 wherein collimated image rays from an upper portion of the prism sheet converge with collimated image rays from a lower portion of the prism sheet within the image observation zone.

The image observation zone is a region where the collimated image rays reflected twice by the prism sheet converge to a focal point. A standing observer may be located within the image observation zone.

The present invention provides a prism sheet configured to reflect light rays twice within a single plane, such as a sagittal plane. This can be referred to as a quasi-retroreflective prism sheet, or a "QR" prism sheet. Retroreflective surfaces are known to redirect incident light rays back along exactly the same optical path. Retroreflective surfaces can redirect a majority of incident light rays three times at most, such that the first two reflections generally redirect the light rays in one plane only, while the third redirection constrains the ray in two planes, thus returning it to source. In contrast, the prism sheet of the present invention redirects light twice by reflection, with the second redirection orienting the light rays towards an image observation zone.

The source of image point rays can comprise:
 a light source configured to emit light rays; and,
 an image display device configured to receive the light rays from the light source, and generate image point rays.

The image display device may be a liquid crystal display (LCD) screen.

Alternatively, the source of image point rays can be a projector unit. The projector unit can comprise a projector and an adjacent mirror. The projector can generate the image point rays and direct them towards the mirror. The mirror can be arranged to reflect the image point rays, as described in more detail below.

The collimating device can be a single contiguous linear (or one-dimensional) array of collimators producing a single contiguous linear array of collimated image rays. The collimating device may be a Monobloc collimator. A Monobloc collimator may house a single contiguous linear array of collimating lens stacks. The collimating lens stacks may comprise stacks of convex and concave lenses.

Alternatively, the collimating device can be a single collimator producing the collimated image rays. The single collimator may be a reflective Fresnel lens, such as a specularly reflecting Fresnel lens. The Fresnel lens may comprise a mirror. The single collimator may comprise a catadioptric reflector (such as a mirror lens).

The collimated image rays can have a rectangular, or landscape, aspect ratio. That is, the collimated image rays together form a bundle of image rays which is wider than it is high. The collimated image rays incident on the prism sheet can be a narrow bundle of image rays, which make an acute angle between the collimated image rays incident on the prism sheet and the plane of the prism sheet. After reflection from the second facet, the reflected collimated image rays can be a relatively larger bundle of image rays, which make a relatively larger angle (less acute or more obtuse) between the reflected collimated image rays and the plane of the prism sheet.

Reflection from the first and second facets can therefore change the aspect ratio of the collimated image rays entering the image observation zone. That is, the prism sheet can expand or stretch, such as elongate, the beam of collimated image rays in the direction in which the bundle of image rays is the narrowest. That is, the bundle of image rays may be stretched in height. This advantageously produces a bundle of image rays, and a resulting image as seen in the image observation zone, having a more conventional viewing aspect ratio. For example, upon double reflection by the prism sheet, the resulting image may have an aspect ratio of 16:9 (width to height). Such expansion by the prism sheet also provides a wide viewing zone of indefinite viewing distance.

Embodiments comprising a single contiguous linear array of collimators providing a single contiguous linear array of collimated image rays, will result in an autostereoscopic image display. That is, an observer will perceive the resulting image to have three-dimensional depth.

In embodiments comprising a single contiguous linear array of collimated image rays, both the collimating device and the prism sheet are compact enough to allow a flat display to be mounted to a wall.

Embodiments comprising a single collimator will result in a non-autostereoscopic image display. Such embodiments comprising a single collimated image can be formed using unobtrusive optics that also allow for a slim, wall mountable unit.

The collimating device can produce overlapping collimated image rays. As such, image points generated by the image display device can be received by multiple regions of the prism sheet.

The prism sheet can comprise a prismatic surface and a relatively flat surface. The prismatic surface can comprise the array of micro-prisms. The micro-prisms typically have dimensions less than a millimetre (sub-millimetric). Each micro-prism can comprise pairs of opposing prism facets.

Each micro-prism can comprise a leading facet and a tail facet. The leading facet may have an acute angle to the plane of the flat surface, when measured anti-clockwise from the plane of the flat surface to the leading facet. The tail facet may have a relatively obtuse angle to the plane of the flat surface, when measured anti-clockwise from the plane of the flat surface to the tail facet. The tail facet may be substantially perpendicular to the plane of the flat surface. The length of the leading facet may be longer than the length of the tail facet.

The collimating device can be located at one end of the prism sheet and on the same side of the prism sheet as the prismatic surface, such that the collimated image rays are either first incident on the tail facets or first incident on the leading facets. The collimated image rays can be first reflected by a tail facet of one micro-prism, and then reflected by the leading facet of an adjacent micro-prism; or the collimated image rays are first reflected by a leading facet of one micro-prism, and then reflected by the tail facet of an adjacent micro-prism. The second reflection redirects the rays towards an observer.

The prism facets can be arranged such that a subtended angle in the plane perpendicular to the plane of the prism sheet, and viewed from the point where the image rays converge in the image observation zone, ranges from 20 degrees to 40 degrees, such as 30 degrees. Outside of this range, image degradation is likely to increase.

The prism sheet may be configured to receive the collimated image rays directly or indirectly. The image point rays can propagate directly or indirectly from the source towards the collimating device.

In one embodiment, the apparatus may further comprise:
a single reflector;
a further single reflector; and,
an intermediate prism sheet; the intermediate prism sheet comprising an array of prisms, each prism having two reflective facets arranged such that each collimated image ray is consecutively reflected off a first facet and then an adjacent second facet;
wherein the single reflector is configured to receive the collimated image rays from the collimating device and redirect them towards the intermediate prism by way of a single reflection;
wherein the intermediate prism sheet receives the collimated image rays from the single reflector, reflects the collimated image rays off a first facet and then an adjacent second facet, the second reflection orienting the collimated image rays towards the further single reflector;
wherein the further single reflector receives the collimated image rays from the intermediate prism sheet and redirects the collimated image rays by way of a single reflection towards the prism sheet.

The single reflector may be a surface mirror. The further single reflector may be a single reflection prism sheet.

The intermediate prism sheet can also be referred to as a quasi-retroreflective prism sheet.

In another embodiment, the apparatus can further comprise:
a diffuser arranged to receive the image point rays from the source, and output diffuse image point rays;
a retroreflective screen adjacent to the diffuser, and arranged to receive the diffuse image point rays from the diffuser, and output redirected image rays oriented towards the source.

In embodiments comprising a diffuser and retroreflective screen, the source of image point rays may be a projector unit. The projector unit may be configured to project an image onto a mirror adjacent the projector. The mirror may redirect the image towards the retroreflective screen. The retroreflective screen may comprise a plurality of beads, such as glass beads, at least partially embedded in a reflective substrate.

The retroreflective screen may be located on a vertical or horizontal surface, such as a wall or a ceiling. Preferably the screen is located on a ceiling.

The diffuser can be additionally arranged to receive the redirected image rays from the retroreflective screen and produce twice diffused image rays oriented towards the source. As such, the image rays may be diffused twice.

The diffuser can be an anisotropic diffuser sheet arranged to asymmetrically diffuse the image point rays. The diffuser may be configured to sufficiently spread the image rays so that they cover a surface area of the collimating device. For example, the image rays may be spread such that they cover the area of a single collimating lens. Diffusing the image rays twice can help to provide sufficient spread.

The collimating device can be adjacent to the source of image point rays, and be arranged to receive the twice diffused image rays, and produce collimated image rays. The collimated image rays can then be directed towards the prism sheet.

A projector unit in combination with a retroreflector, a diffuser, and a single collimator lens, will result in a non-autostereoscopic image (no three-dimensional depth perception). However, where a non-autostereoscopic image is satisfactory, this combination of components provides a more economical yet unobtrusive wall mounted image display.

Accordingly, in a second aspect, the present invention provides a method for directing an image towards an observer, the method comprising:

generating image point rays;

collimating the image point rays to form collimated image rays;

reflecting the collimated image rays twice from a prism sheet, the prism sheet comprising an array of micro-prisms; each micro-prism having two reflective facets;

wherein reflecting the collimated image rays twice from a prism sheet comprises:

reflecting the collimated image rays from a reflective facet of a first micro-prism; and then, reflecting the collimated image rays from a reflective facet of an adjacent micro-prism, thereby reorienting the collimated image rays towards an image observation zone; and, wherein collimated image rays from an upper portion of the prism sheet converge with collimated image rays from a lower portion of the prism sheet within the image observation zone.

The image directed towards the observer can be a distant view on or near the horizon.

The prism sheet can comprise a prismatic surface and a relatively flat surface, the prismatic surface can comprise the array of micro-prisms. The micro-prisms can have dimensions of less than a millimetre (sub-millimetric). Each micro-prism can comprise pairs of opposing prism facets. Each micro-prism can comprise a leading facet and an opposing tail facet.

The step of reflecting the collimated image rays twice from a prism sheet can further comprise:

reflecting the collimated image rays from the leading facet of a first micro-prism; and then, reflecting the collimated image rays from the tail facet of an adjacent micro-prism.

Alternatively, the step of reflecting the collimated image rays twice from a prism sheet can further comprise:

reflecting the collimated image rays from the tail facet of a first micro-prism; and then, reflecting the collimated image rays from the leading facet of an adjacent micro-prism.

The collimated image rays may have a rectangular, or landscape, aspect ratio. That is, the image rays form a bundle which is wider than it is high. Reflection from the first and second facets can reduce the aspect ratio of the collimated image rays entering the image observation zone (as described above). As such, the narrower dimension (the height) is stretched, thus forming a more conventional aspect ratio.

After forming the collimated image rays, the method can further comprise the steps of:

redirecting the collimated image rays towards an intermediate prism sheet by way of reflection from a single reflector; then, redirecting the collimated image rays twice by the intermediate prism sheet by way of reflection, the second redirection causing the collimated image rays to travel towards a further single reflector; and then, redirecting the collimated image rays by way of reflection from the further single reflector towards the prism sheet.

The single reflector may be a surface mirror. The further single reflector may be a single reflection prism sheet.

Before forming collimated image rays, the method can comprise the steps of:

redirecting image point rays by way of reflection towards a diffuser;

diffusing the redirected image rays to produce diffuse image rays;

redirecting diffuse image rays by way of retroreflection to form redirected diffuse image rays directed back towards the projector unit; and, diffusing the redirected diffuse image rays to produce twice diffused image rays.

The step of redirecting diffuse image rays by way of retroreflection can be by way of a retroreflective screen. The retroreflective screen may be mounted to a surface, such as a wall or a ceiling. Preferably the screen is located on a ceiling. The retroreflector may be a micro-corner cube type, a glass bead type or otherwise. The retroreflective screen may have the same dimensions as a bundle of image point rays generated by the source.

The steps of diffusing the image rays may be by way of a diffuser. The diffuser may be adjacent to the retroreflective screen. The diffuser may be an anisotropic diffuser sheet.

The image point rays can be generated by a projector unit configured to project an image onto a mirror adjacent the projector unit. The step of redirecting the image point rays can comprise:

projecting the image point rays onto a mirror; and, redirecting the image point rays by way of reflection towards the retroreflective screen.

The step of diffusing the redirected image rays can comprise diffusing only the real redirected image rays.

The twice diffused image rays can be collimated by a single collimating device, such as a reflective collimating lens.

After the step of diffusing the redirected diffuse image rays to produce twice diffused image rays, the method can further comprise the step of reflecting the twice diffused image rays from a reflective collimating lens to produce the collimated image rays.

With regard to each aspect of the invention, when collimated image rays having a narrow and rectangular aspect ratio incidents the prism sheet, the narrower dimension (the height) is effectively increased as the image is "stretched". Since the image rays are collimated, any stretching of the image in the vertical (sagittal) plane will not result in the image itself being vertically deformed. That is, the aspect ratio of the image rays will always be preserved. As such, collimated image rays having a narrow and rectangular aspect ratio can be stretched in the direction in which it is narrow by said prism sheet, such that it corresponds to a more conventional viewing aspect ratio.

Whilst the invention has been described above, it extends to any inventive combination set out above, or in the following description or drawings.

BRIEF DESCRIPTION OF THE DRAWINGS

The invention may be performed in various ways, and embodiments thereof will now be described by way of example only, reference being made to the accompanying drawings, in which.

DETAILED DESCRIPTION OF EMBODIMENTS

Figure 1:
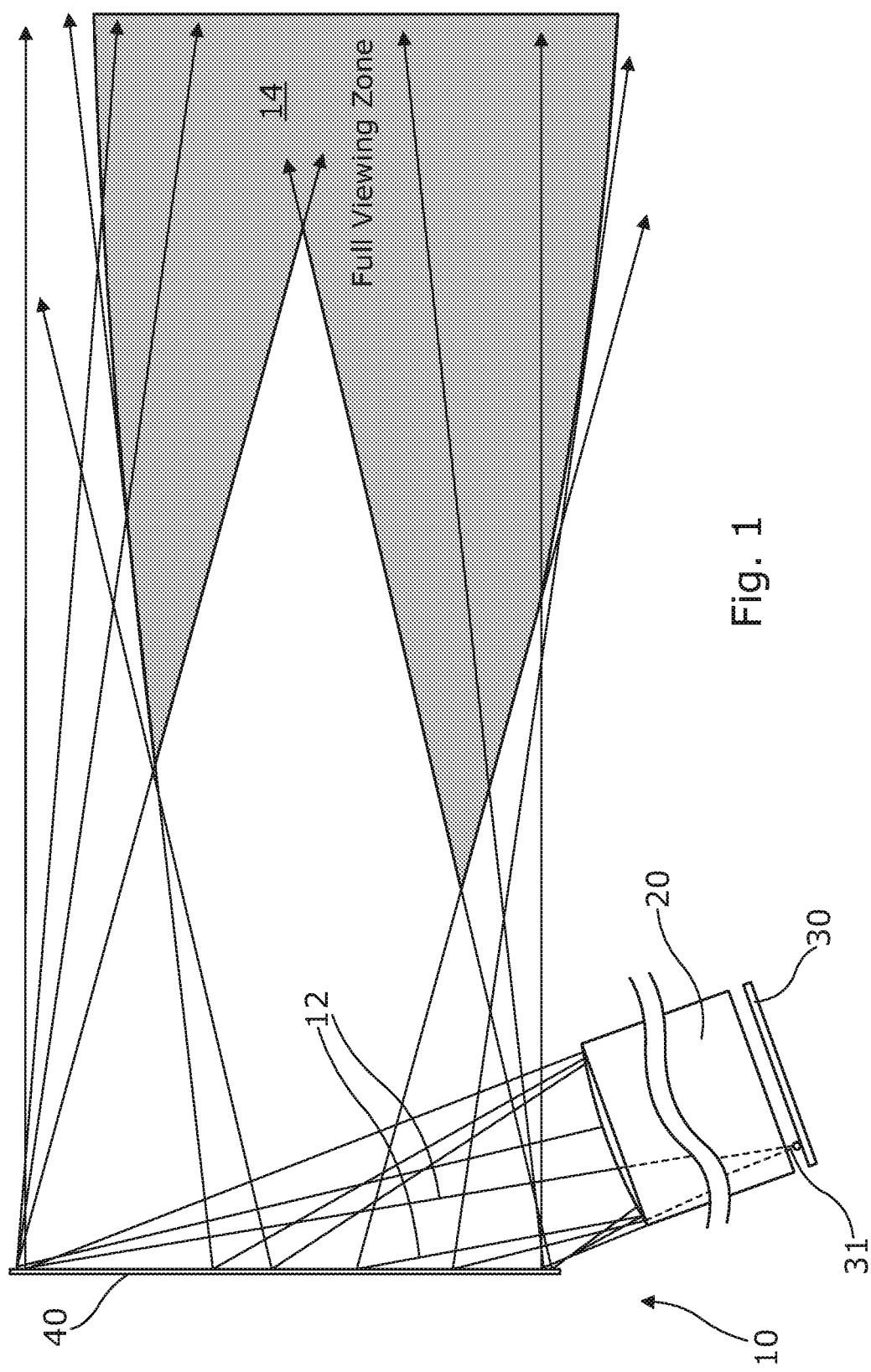
FIG. 1 shows an image display apparatus according to embodiments of the present invention.

FIG. 1 shows an image display apparatus 10 comprising a collimating device 20 in the form of a Monobloc, and an image display device 30 in the form of an LCD screen. The LCD screen 30 comprises a light source in the form of LED lighting (not shown). In use, the LCD screen 30 is configured to receive light rays from the LED light source, and generate and output image point rays 31.

A Monobloc 4 is typically used when three-dimensional viewing of an image is desired (auto-stereoscopic viewing). The structure of Monobloc 20 is shown in more detail in FIG. 2. The Monobloc 20 comprises a single contiguous linear (one-dimensional) array of collimating lens stacks 22, with each stack 22 comprising an arrangement of convex lenses 26 and concave lenses 24. The input to the Monobloc 20 will be a plurality of image point rays 31 from the LCD screen 30, and the output will be a single contiguous linear (one-dimensional) array of collimated image rays 12.

The Monobloc 4 works by collimating image point rays 31 located within a specific imaging area (specific to a particular collimating optical stack 22) on a common image plane 28, to form virtual image points V. When two or more image points on an image display device 30 (e.g. the LCD screen) are located in exactly the same position in relation to their respective collimating optical stack (as shown in View 1 and View 2), the collimated image rays 12 from each image point will exit the Monobloc 4 parallel to each other creating a single virtual image that appears to be at infinity focus. Under these circumstances, both stereopsis (the perception of depth) and focal accommodation (the adjustment of the eye to keep the image in focus) are in agreement and the image satisfies all distance cues. The eye is under no strain in these circumstances.

However, when common image points are positioned closer together (as shown in View 3), they form a virtual image point $C_p$. The distance D between $C_p$ and the observer 13 is a function of the convergence angle subtended by the observer's eyes. This can cause visual discomfort if D is very close to the viewer.

Furthermore, a zone devoid of image data $I_m$ can arise when common image points move closer together as in View 3. This leads to a visual artefact known as "picket fencing" that goes from dismissively small when eye convergence is minimal (i.e. when viewing distant virtual images) to significant, when viewing foreground virtual images.

The image display apparatus of the present invention is therefore optimally configured for distant or mid-distant views, such that it can support minimal horizontal parallax (where each eye simultaneously presents a different view), without causing visual discomfort.

Figure 2:
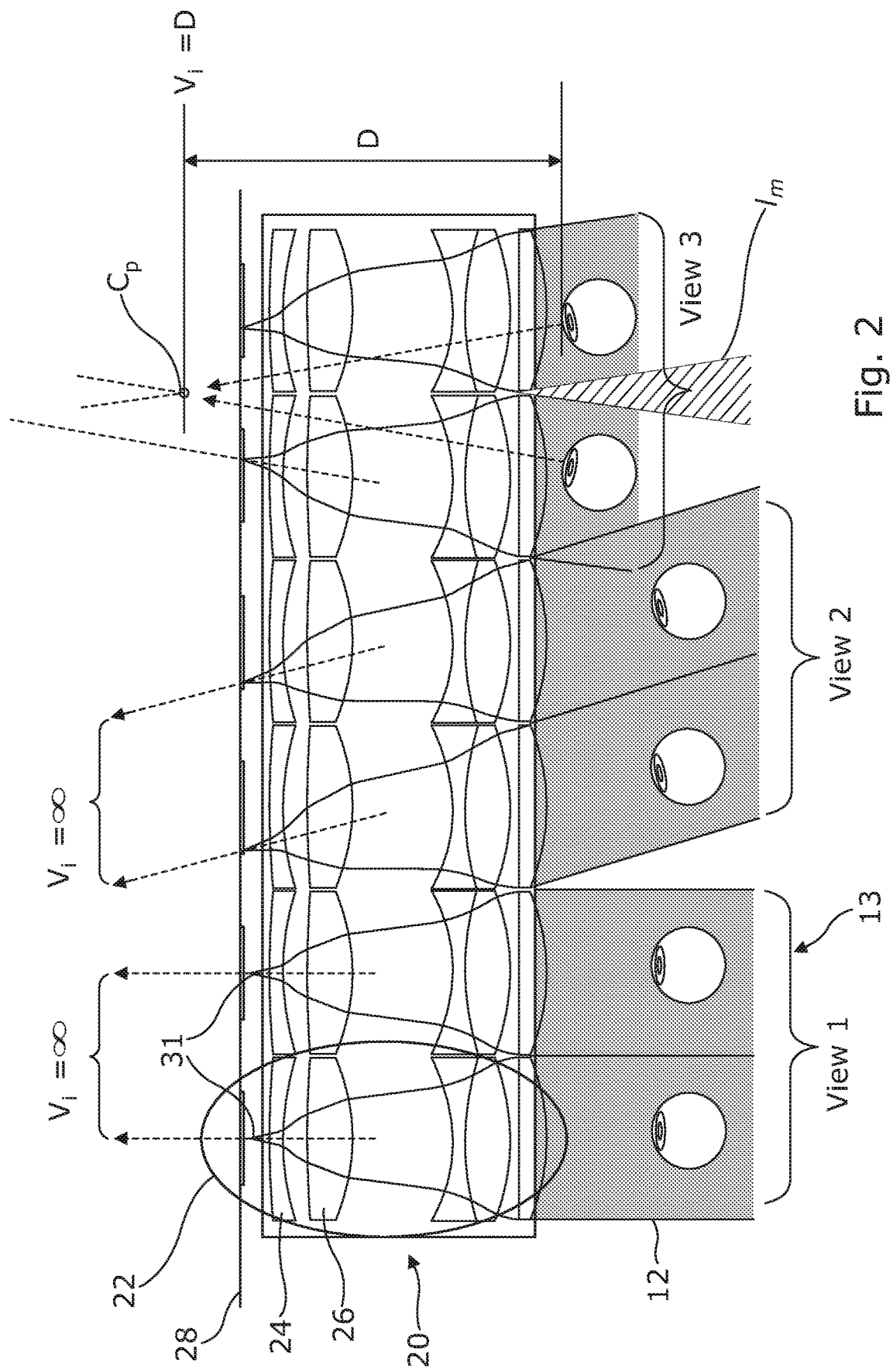
FIG. 2 shows an example of a Monobloc collimator.

In use, the Monobloc 20 is configured to receive and collimate the image point rays 31 from the LCD screen 30, and output collimated image rays 12. As shown in FIG. 2, each stack of lenses 22 receives the image point rays 31, and as they pass through each lens, the rays are expanded, and finally collimated (the output image rays are parallel to each other).

The apparatus 10 also comprises a prism sheet 40. The prism sheet 40 is comprised of small prism facets (typically sub-millimetric), and may be made of a compression moulded plastic material coated with a vacuum deposited metal, such as aluminium.

In use, collimated image rays 12 exit the Monobloc 20 and travel towards the prism sheet 40. The prism sheet 40 directly receives the collimated image rays 12 and redirects them twice by way of reflection. The second reflection redirects the collimated image rays 12 towards an observer 13 in an image observation zone 14.

Figure 3:
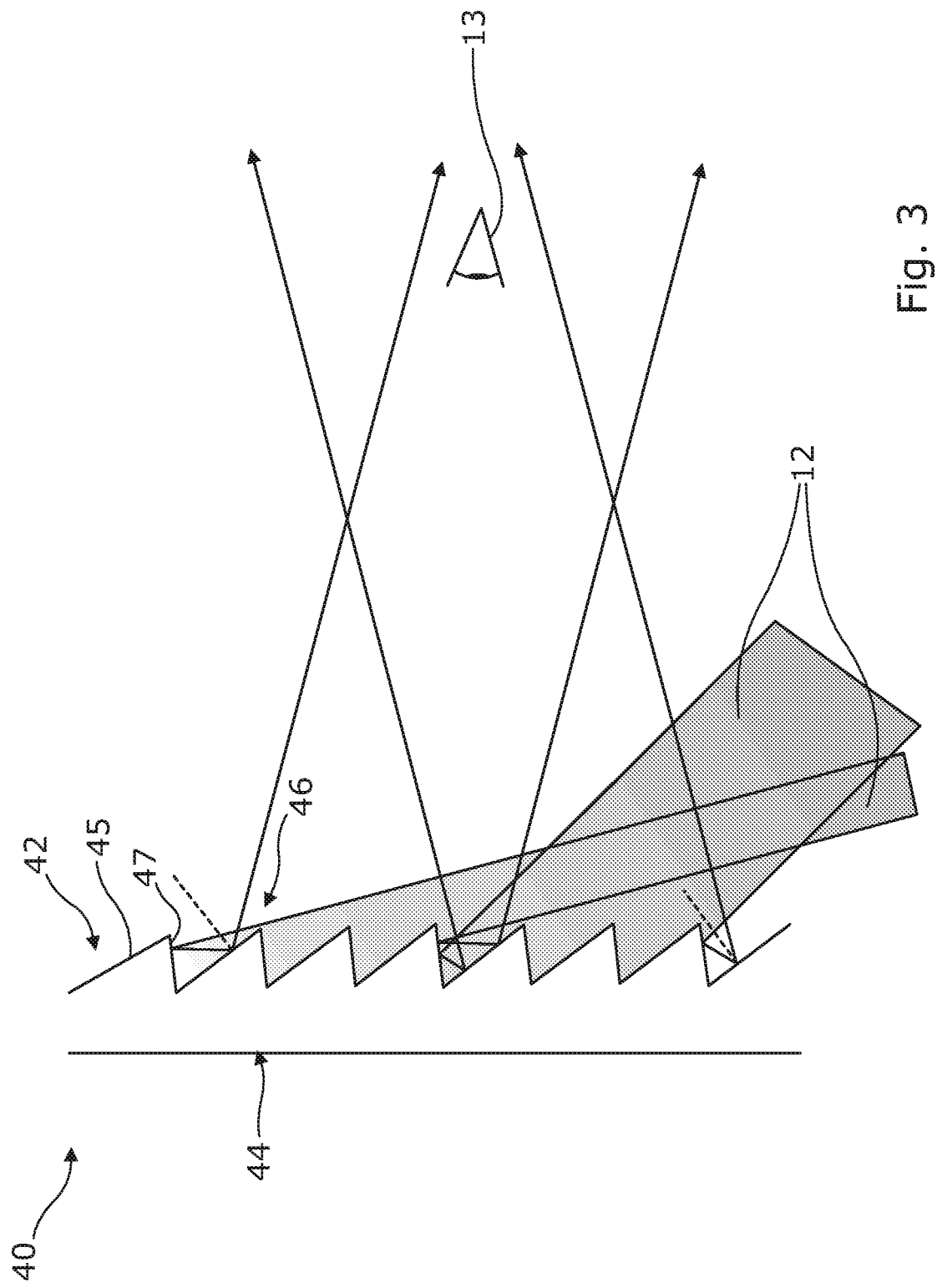
FIG. 3 shows a close-up view of the structure of the prism sheet causing collimated light to be directed toward a viewer located within an image observation zone.
Figure 7:
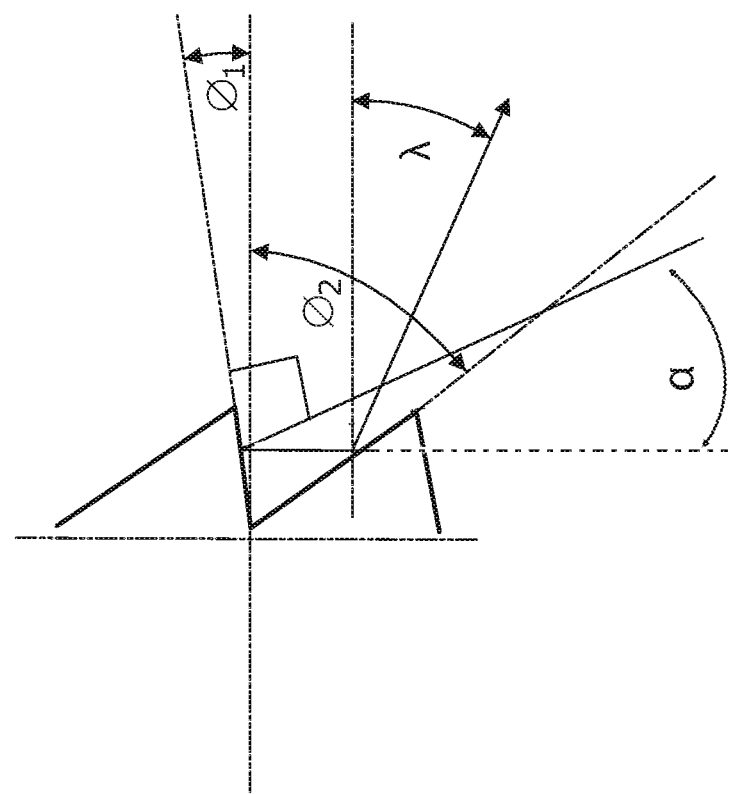

The structure of prism sheet 40 is shown in more detail in FIG. 3. The prism sheet 40 comprises a prismatic surface 42 and a relatively flat surface 44. The prismatic surface 42 comprises a plurality of micro-prisms 46. Each micro-prism comprises a leading facet 45 and a tail facet 47. The leading facet 45 is long and forms an acute angle with the plane of the flat surface 44 (when measured anti-clockwise from the plane of the flat surface to the leading facet); whereas the tail facet 47 is shorter and forms a relatively obtuse or right angle with the plane of the flat surface 44 (when measured anti-clockwise from the plane of the flat surface to the tail facet). In this example, and as seen in FIG. 7, the tail facet 47 is almost perpendicular (around 97 degrees) to flat surface 44.

In use, the Monobloc 20 and the prism sheet 40 are arranged such that the collimated image rays 12 from Monobloc 20 are incident on tail facets 47. As seen in FIG. 1, the collimated image rays 12 incident on prism sheet 40 form a bundle which is relatively narrow, and which makes an acute angle with the prism sheet 40 (as measured anti-clockwise from the plane of the prism sheet 40 to the incident collimated image rays 12). After reflection from the prism sheet 40, the reflected collimated image rays are stretched, that is the bundle is larger, and has a relatively larger angle with the prism sheet 40 (as measured anti-clockwise from the plane of the prism sheet 40 to the reflected collimated image rays).

As can also be seen in FIG. 1, for example, the collimated image rays 12 received by the prism sheet overlap each other, such that there is no specific area on the prism sheet 40 dedicated to a specific image point on the image display device 30 (for example, no specific pixel on the LCD screen). This will allow an observer to move within the image observation zone 14 without any loss of depth perception. That is, the observer maintains an autostereoscopic view of the image whilst moving around the image observation zone 14. The observer does not need to remain stationary (fixed in a single position) to observe the image.

As shown in FIG. 3, the collimated image rays 12 are received by tail facets 47 of a first micro-prism, and then redirected by reflection towards a leading facet 45 of an adjacent micro-prism. The collimated image rays 12 are then redirected by reflection from leading facet 45 towards an observer 13 in the image observation zone 14.

Figure 6:
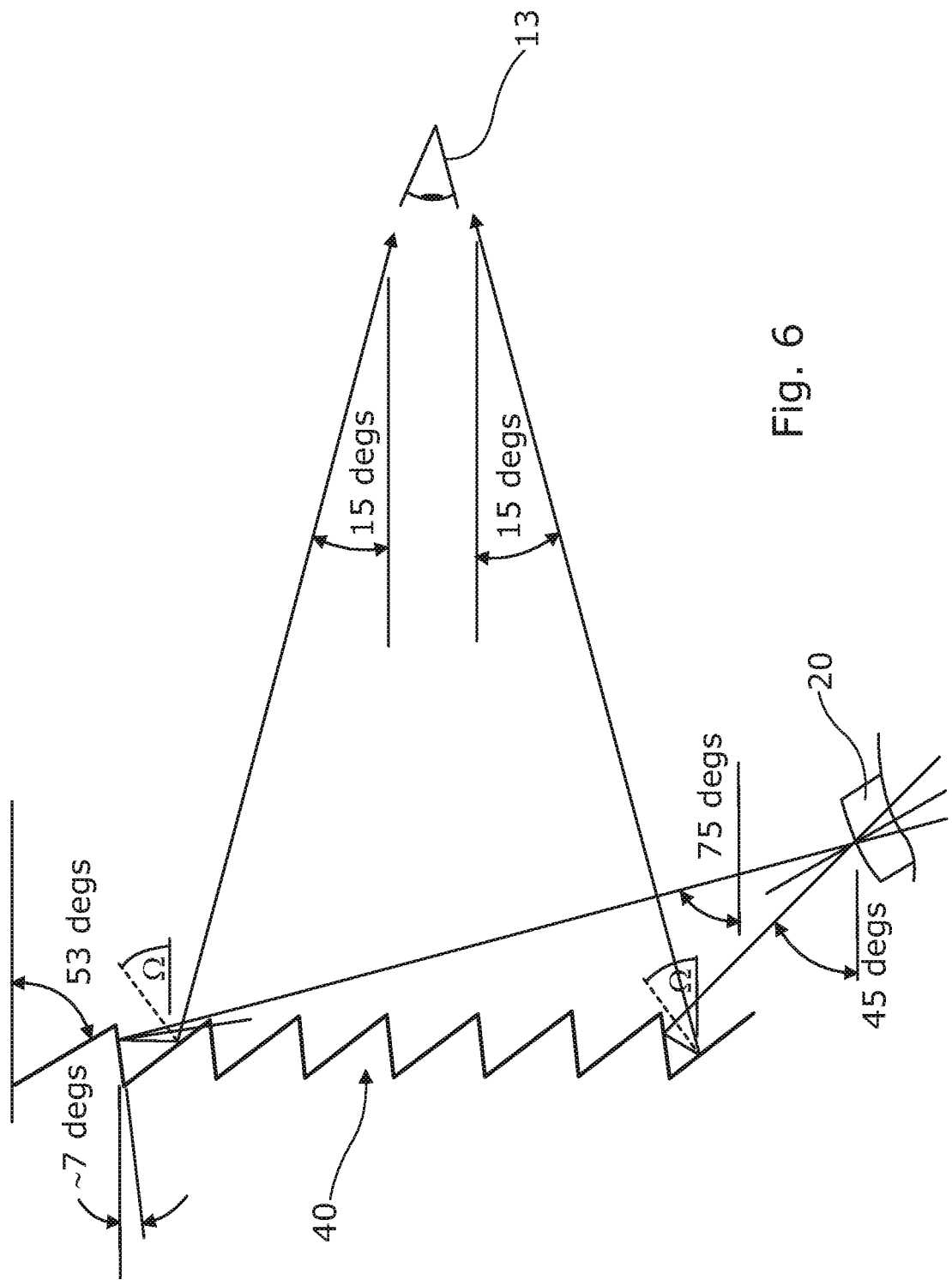
FIG. 6 shows an example prism facet configuration according to the present invention.

The image observation zone 14 is the region where the collimated image rays 12 reflected twice from the prism sheet 40 converge. As can be seen in FIG. 6, the structure of the micro-prisms 46 is chosen such that the collimated image rays 12 travelling towards the image observation zone 14 from the upper and lower parts of the prism sheet 40, result in a subtended angle of around 30 degrees when viewed from the point where the image rays converge in the image observation zone 14, and in a plane perpendicular to the plane of the prism sheet 40.

A bisector angle Ω between the first and second reflections remains the same for all points of reflection on the leading facets 45.

Figure 4:
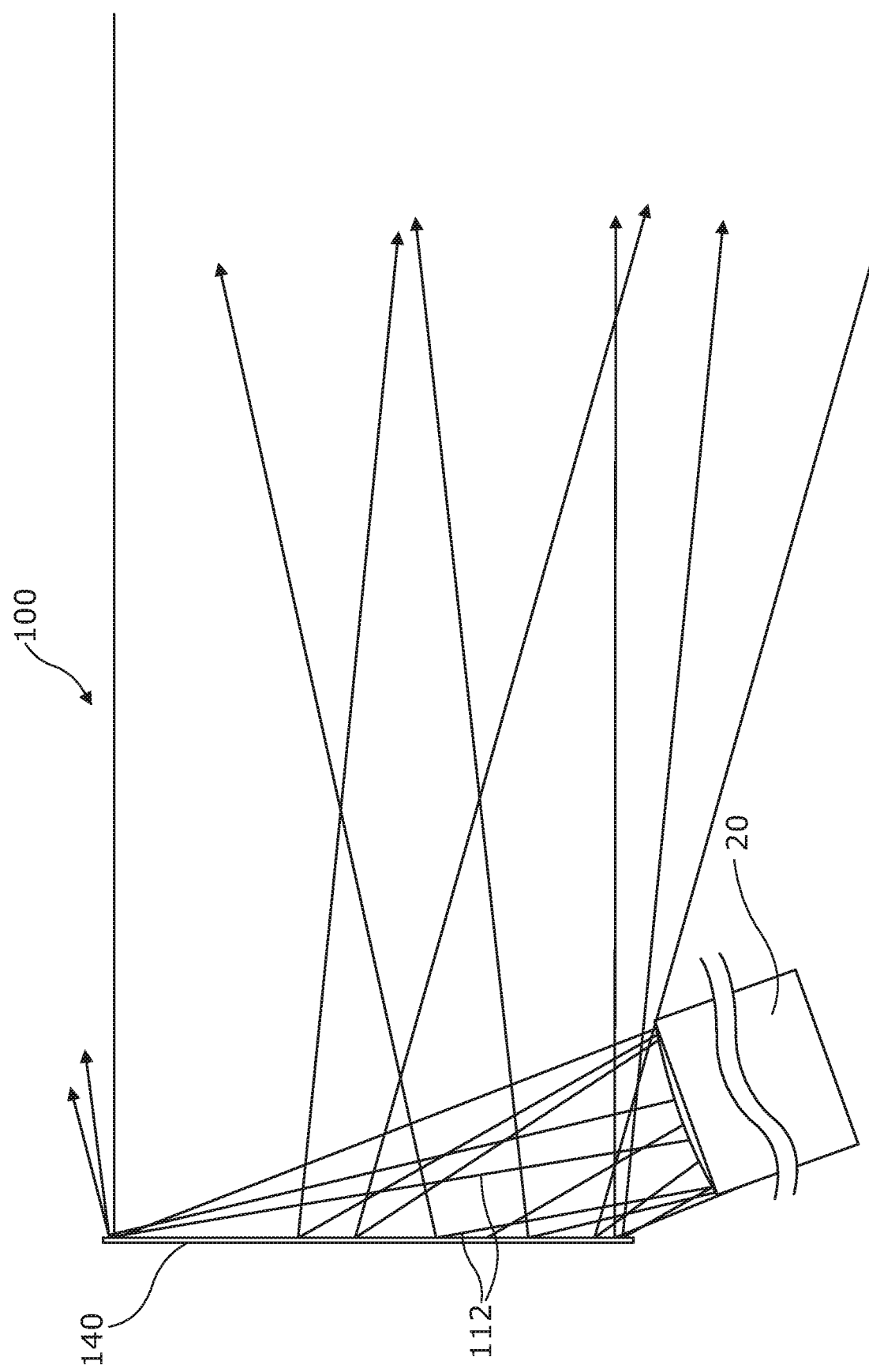
FIG. 4 shows the travel path of collimated image rays when using a single reflection prism sheet of identical size as the FIG. 2 double reflection prism sheet.

FIG. 4 shows a similar image display apparatus 100 to that of FIG. 1. However, in this example the prism sheet 140 is configured to reflect the collimated image rays 112 once only. That is, the prism sheet 140 receives the collimated image rays 112 and immediately redirects them by way of reflection towards an observer. The prism sheet 140 is identical in size and shape to prism sheet 40. However, as can bee seen in FIG. 4, the single reflection prism sheet 140 fails to create an image viewing zone. This is because the reflected image rays will deviate away from one another, such that the rays from the upper and lower parts of the prism sheet 140 fail to intersect/converge.

Figure 5:
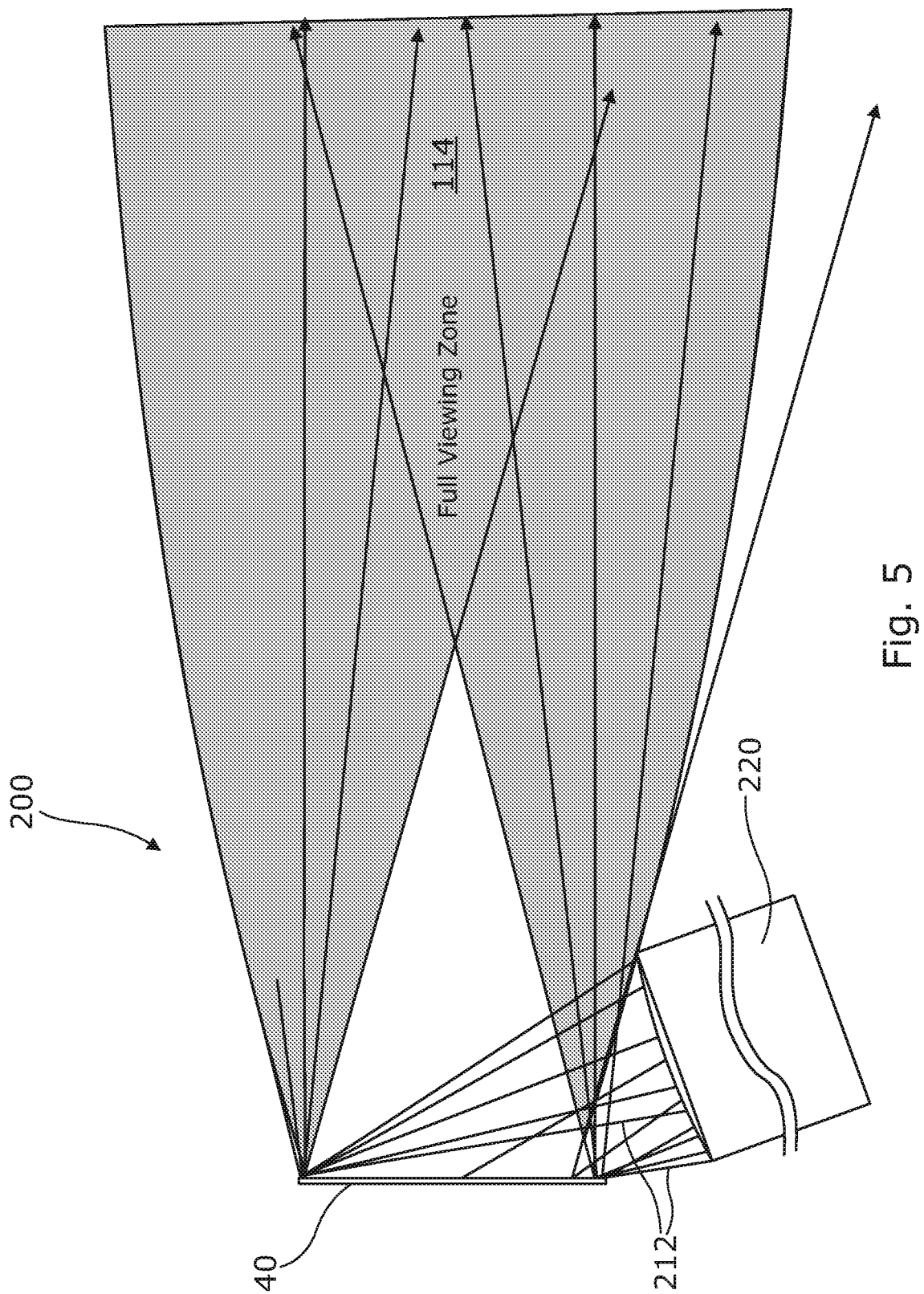
FIG. 5 shows how a viewing zone can be created using a single reflection prism sheet.

As shown in FIG. 5, apparatus 200 comprises a collimating device 20 which is much wider in relation to the prism sheet 240. Such a configuration does allow an image viewing zone 114 to be created, however this arrangement is undesirable because such a collimating device 220 will be more expensive to produce and far less compact compared to the apparatus having a doubly reflective prism sheet.

As such, the present invention provides an image display apparatus which is much easier and cheaper to manufacture. Due to the presence of the doubly reflective prism sheet, the present invention also provides an apparatus which is more compact, and is therefore unobtrusive when mounted to a wall or a ceiling. The doubly reflective prism sheet also allows the image rays to converge to form a wide viewing zone of indefinite viewing distance (auto-stereoscopic viewing).

Figure 8:
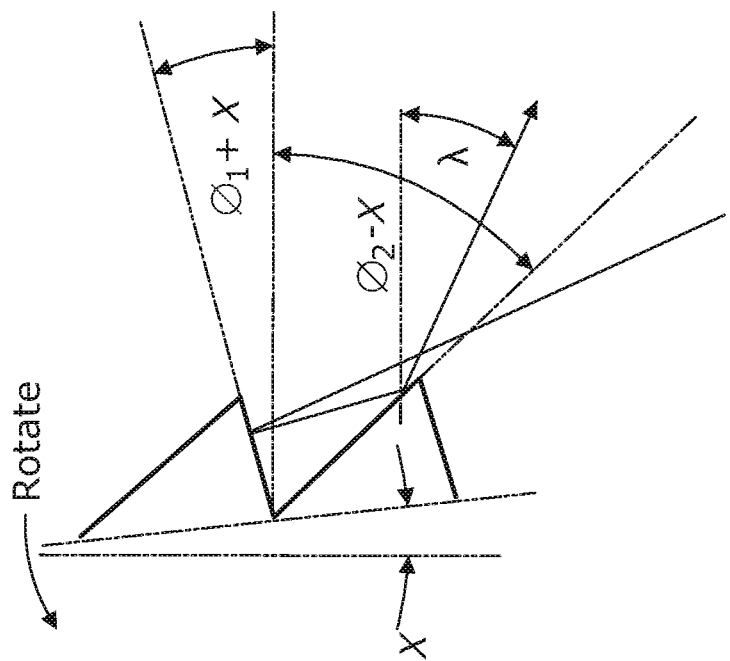
FIGS. 7 & 8 show how any warping of the prism sheet can be accommodated, such that the reflected ray angle of an incident ray remains unchanged.

The prism sheet 40 is also capable of bending slightly, such as in a plane perpendicular to the undeflected plane of the prism sheet, without warping the image observed in the image observation zone 14. That is, the prism sheet 40 beneficially exhibits deflection resilience. FIGS. 7 and 8 demonstrate how the prism sheet accommodates such deflection.

FIG. 7 shows the undeflected prism sheet 40, whereas FIG. 8 shows slight deflection through an angle x. After rotation/warping, the angle of incidence of the micro-prism facets will also change their angle of incidence by angle x. Geometrically this may be expressed and analysed as follows:

Letting x be the rotation angle of the prism (the deflection), we obtain:

$$\lambda = 90 - (\alpha - 1(\varnothing_1 + x - \varnothing_2 - x + 90));$$

wherein:
$\varnothing_1$ is the angle between the normal to the flat surface of the prism sheet and a tail facet;
$\varnothing_2$ is the angle between the normal to the flat surface of the prism sheet and a leading facet;
A is the angle between the double reflected collimated image rays and the normal to the flat surface of the prism sheet; and, α is the angle of the collimated image rays incident on a tail facet (as measured anti-clockwise from the plane of the prism sheet to the incident collimated image rays).

All the x terms have cancelled out, showing that the reflected ray angle λ is unchanged by the deflection x. As such, the reflected ray angle λ remains the same for all collimated light incident on the prism sheet 40.

Figure 9:
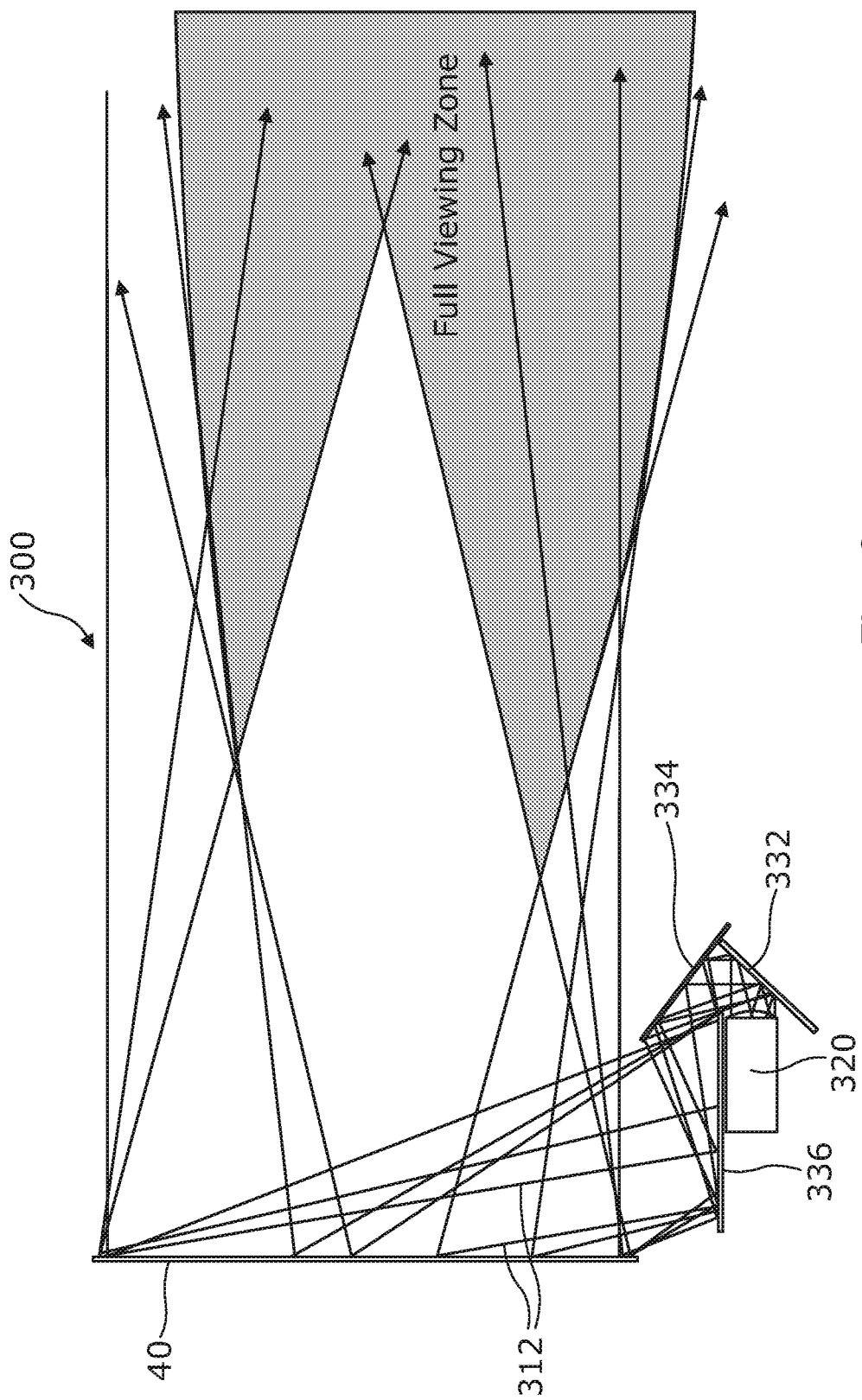
FIG. 9 shows an image display apparatus using the FIG. 2 collimator according to another embodiment of the present invention.

FIG. 9 shows another embodiment of an image display apparatus 300. The prism sheet 40 is the same as described above, and will not be described in detail again here.

In contrast to the above embodiments, FIG. 9 comprises a smaller Monobloc 320, as well as a surface mirror 332, an intermediate prism sheet 334, and a third prism sheet 336. The second prism sheet 334 is a further doubly reflective prism sheet, whereas the third prism sheet 336 is a single reflection prism sheet.

In use, collimated image rays 312 exit Monobloc 320 and travel towards the surface mirror 322 where they are reflected to doubly reflective prism sheet 334. As described above, the collimated image rays 312 are then reflected twice, with the second reflection redirecting the collimated image rays 312 onto the single reflection prism sheet 336. The single reflection prism sheet 36 then reorients the collimated image rays 312 onto prism sheet 40. The collimated image rays 312 are then redirected towards the image observation zone 14 where they converge.

In contrast to the prism sheet 40 of FIG. 1, the prism sheet 40 of FIG. 9 receives the image point rays indirectly. That is, the collimated image rays 312 are incident on the tail facets 47 after the image point rays have been reflected from the surface mirror 32, second prism sheet 34, and third prism sheet 36.

In this particular embodiment, the surface mirror 32, the intermediate prism sheet 34, and the single reflection prism sheet 36 together help to effectively expand the exit aperture of a comparatively small Monobloc 320 aperture. This beneficially helps to make the image display apparatus even more compact.

Figure 10:
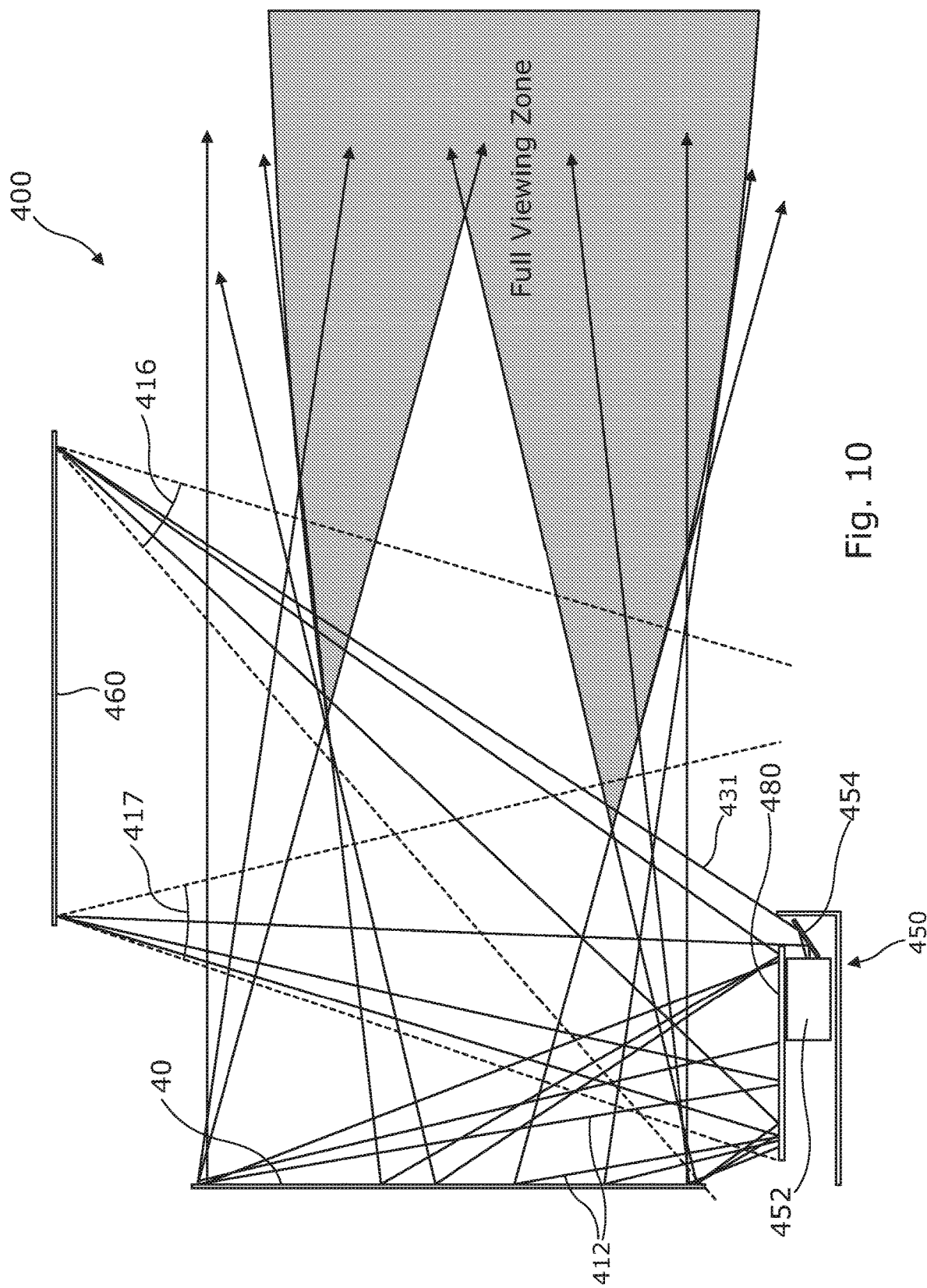
FIG. 10 shows an image display apparatus according to embodiments of the present invention.

FIG. 10 shows an image display apparatus 400 according to another embodiment of the present invention, comprising a projector unit 450 having a projector 452 and a mirror 454. The projector unit 450 acts as the light and image source.

A retroreflective screen 460 is located above the projector unit 450. An anisotropic diffuser 470 is located adjacent to and below the retroreflector 460. A collimator 480 is arranged adjacent to and above projector unit 450.

Figure 11:
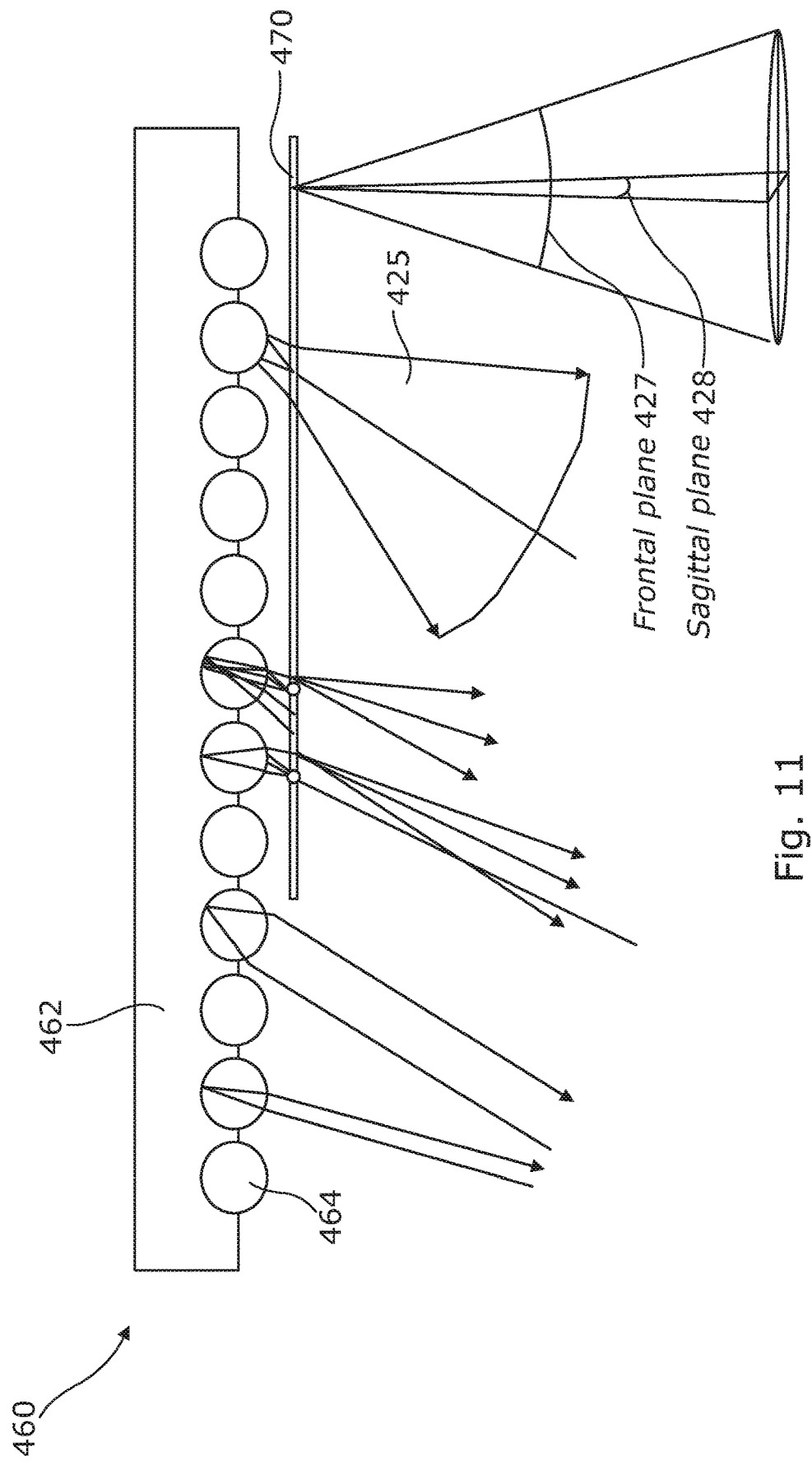
FIG. 11 shows an example of a retroreflective sheet and diffuser.

FIG. 11 shows an example of a retroreflective screen 460 having glass beads 464 embedded in a reflective substrate 462. Each glass bead 464 may be a different size, a random assortment of sizes, or they may all be of a similar or the same size. The glass beads 464 substantially retroreflect by way of total internal reflection (that is, they redirect the light precisely three times). If the angle of incidence of the image point rays 431 is such that total internal reflection is not permitted, then the image point rays 431 will continue through the respective bead 464, and will be reflected by the substrate 462 instead.

The collimator 480 is a single collimator, such as a specularly reflecting Fresnel lens, which can output collimated image rays 412. The Fresnel lens can be coated with a vacuum deposited metal and configured to collimate incident light much like a parabolic reflector. Another suitable collimator is a transmissive Fresnel lens. The lens first receives and partially collimates image point rays 431, which are then reflected off a first surface mirror situated immediately behind the lens. The mirror in turn reflects the image point rays back through the Fresnel lens such that the formerly partially collimated image rays are now fully collimated 412.

In use, the projector 452 projects an image (comprised of image point rays 431) onto the mirror 454. The mirror 454 then directs the image point rays 431 towards the retroreflective screen 460 by way of reflection.

Before reaching the retroreflective screen 460, the image point rays 431 first pass through diffuser 470. The retroreflective screen 460 then redirects the image point rays 431 back through the diffuser 470 towards the projection unit 450 (the source). The image point rays 431 are therefore diffused twice, thus significantly increasing their spread (shown by 425 in FIG. 11).

Figure 12:
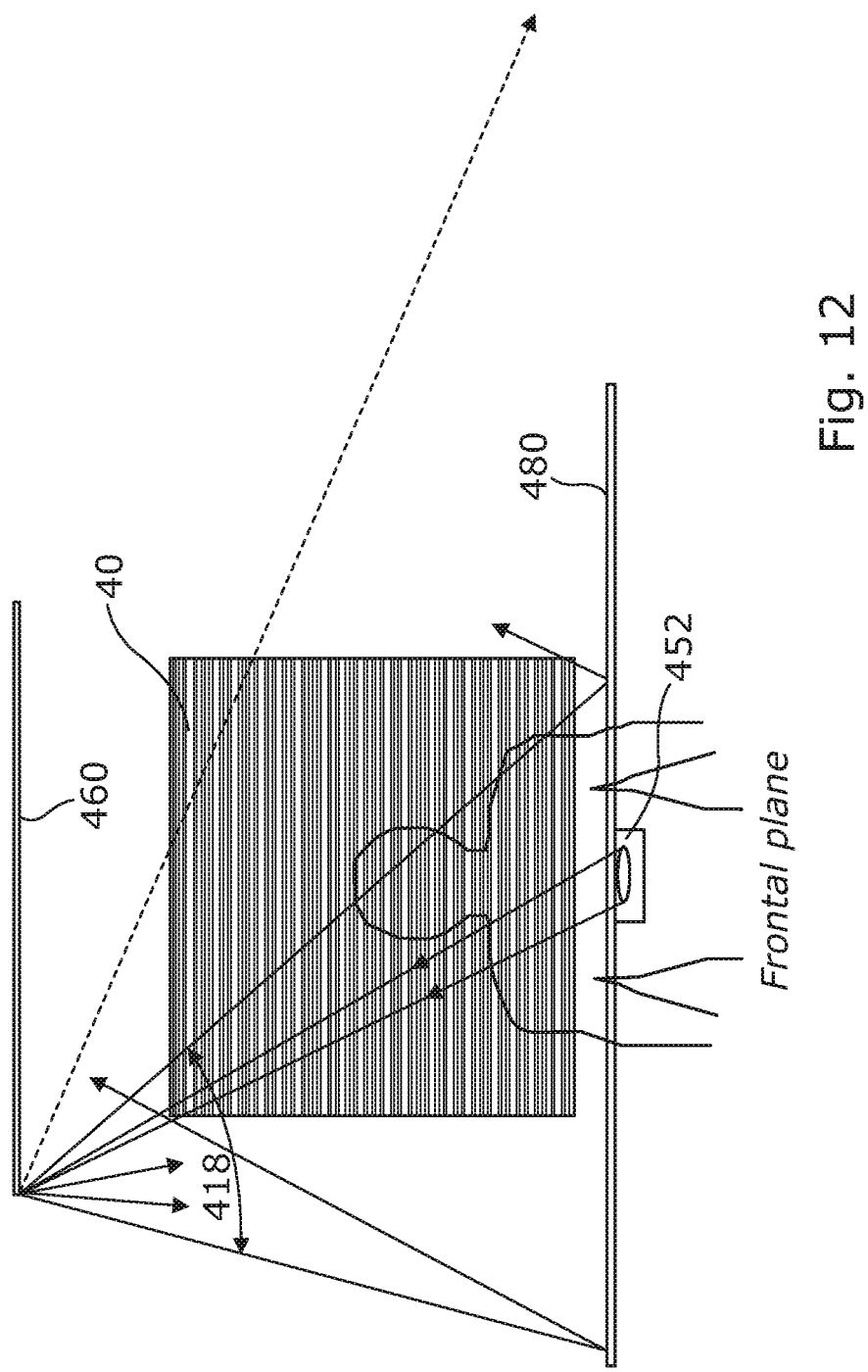
FIG. 12 shows an image display apparatus from the perspective of a viewer in terms of their Frontal plane.

The diffuser 470 diffuses the image point rays 431 asymmetrically. For example, the image point rays 431 may be diffused differently in the plane 427 of the prism sheet (also referred to as the frontal plane with respect to the point of view of an observer in the image observation zone) and the plane 428 perpendicular to this (also referred to as the sagittal place with respect to the point of view of an observer in the image observation zone). As can be seen in FIG. 12, more diffusion 418 is required in the frontal plane 427 than the sagittal plane 428, given the latter only has to diffuse enough so that the image point rays 431 encompass the width of the collimator 480.

As the collimator 480 is located on top of the projector unit 450, the collimator 480 will receive the diffused image point rays 431. As best shown in FIG. 12 (a frontal plane view of FIG. 10), the diffuser 470 is designed so that the twice diffused image point rays 431 will spread sufficiently (shown by 425) to cover the surface area of the collimator 480 (shown in FIG. 10 as 416 and 417). However, too much diffusion will lead to light losses and could also cause images from the retroreflective screen 460 to be received by the prism sheet 40, creating a ghost image. Hence the amount of diffusion must be carefully controlled.

In use, the collimator 480 reflects the diffuse image point rays 431 towards the prism sheet 40. Prism sheet 40 then doubly reflects the collimated image rays 412 as described above.

This embodiment does not produce auto-stereoscopic viewing due to there being only a singular collimator. However, in some situations this may be sufficient, and the above described embodiment provides a compact yet lower cost system.

It will be appreciated that other configurations of image display device and collimating device exist that can produce similar results. One example being where image point rays from a dynamic display, such as an LCD (situated beneath the prism sheet), are collimated by a ceiling mounted Fresnel collimator (situated above the prism sheet). Depending on the geometric relationship between the ceiling mounted Fresnel collimator and the image display device, rays from the collimator will now be received by the leading facets of each micro-prism because the collimated rays are now incident on the prism sheet from above. An image viewing zone will be still be formed as described above.

Furthermore, in every aspect of the invention, the image point rays are always collimated. The resulting displayed image may have undergone collimation by a linear array of collimators (resulting in multiple view points), or a single collimator (resulting in a single view point). Collimated image rays incident on the prism sheet can overlap each other, and as such there is no specific area on the screen dedicated to a specific image point generated by the image display device.

Although the invention has been described above with reference to an exemplary embodiment, it will be appreciated that various changes or modifications may be made without departing from the scope of the invention as defined in the appended claims.

The invention claimed is:

1. An image display apparatus for directing an image towards an observer, the apparatus comprising:
   a source of image point rays;
   a collimating device configured to collimate image point rays to produce collimated image rays; and,
   a prism sheet configured to receive the collimated image rays; the prism sheet comprising an array of micro-prisms, each micro-prism having two reflective facets arranged such that each collimated image ray is reflected off one facet and then an adjacent facet;
   wherein reflection from the second facet reorients the collimated image rays towards an image observation zone; and,
   wherein collimated image rays from an upper portion of the prism sheet converge with collimated image rays from a lower portion of the prism sheet within the image observation zone.

2. The image display apparatus as claimed in claim 1, wherein the source of image point rays comprises:
   a light source configured to emit light rays; and,
   an image display device configured to receive the light rays from the light source, and generate image point rays, wherein the image display device is a liquid crystal display (LCD) screen.

3. The image display apparatus as claimed in claim 1, wherein the source of image point rays is a projector unit, wherein the projector unit projects an image onto a mirror adjacent to the projector, and the mirror redirects the image towards the retroreflective screen by way of reflection.

4. The image display apparatus as claimed in claim 1, wherein the collimating device is an array of collimators producing the collimated image rays.

5. The image display apparatus as claimed in claim 4, wherein the collimating device is a contiguous single linear array of collimators producing a contiguous single linear array of collimated image rays.

6. The image display apparatus as claimed in claim 1, wherein the collimating device is a single collimator producing the collimated image rays.

7. The image display apparatus as claimed in claim 1, wherein the collimated image rays have a rectangular, or landscape, aspect ratio, and wherein reflection from the first and second facets reduces the aspect ratio of the collimated image rays entering the image observation zone.

8. The image display apparatus as claimed in claim 1, wherein the collimating device produces overlapping collimated image rays.

9. The image display apparatus as claimed in claim 1, wherein the prism sheet comprises a prismatic surface and a relatively flat surface, the prismatic surface comprising the array of micro-prisms, wherein each micro-prism comprises a leading facet and a tail facet.

10. The image display apparatus as claimed in claim 9, wherein the collimating device is located at one end of the prism sheet and on the same side of the prism sheet as the prismatic surface, such that the collimated image rays are either first incident on the tail facets or first incident on the leading facets.

11. The image display apparatus as claimed in claim 10, wherein the collimated image rays are first reflected by a tail facet of one micro-prism, and then reflected by the leading facet of an adjacent micro-prism; or the collimated image rays are first reflected by a leading facet of one micro-prism, and then reflected by the tail facet of an adjacent micro-prism.

12. The image display apparatus as claimed in claim 11, wherein the prism facets are arranged such that a subtended angle in the plane perpendicular to the plane of the prism sheet, and when viewed from the point where the image rays converge in the image observation zone, ranges from 20 degrees to 40 degrees, such as 30 degrees.

13. The image display apparatus as claimed in claim 1, wherein image point rays propagate directly from the source towards the collimating device; and wherein the collimated image rays produced by the collimating device propagate directly towards the prism sheet.

14. The image display apparatus as claimed in any of claim 1, the apparatus further comprising:
  a single reflector;
  a further single reflector; and,
  an intermediate prism sheet; the intermediate prism sheet comprising an array of prisms, each prism having two reflective facets arranged such that each collimated image ray is consecutively reflected off a first facet and then an adjacent second facet;
  wherein the single reflector is configured to receive the collimated image rays from the collimating device and redirect them towards the intermediate prism by way of a single reflection;
  wherein the intermediate prism sheet receives the collimated image rays from the single reflector, reflects the collimated image rays off a first facet and then an adjacent second facet, the second reflection orienting the collimated image rays towards the further single reflector;
  wherein the further single reflector receives the collimated image rays from the intermediate prism sheet and redirects the collimated image rays by way of a single reflection towards the prism sheet.

15. The image display apparatus as claimed in claim 14, wherein the single reflector is a surface mirror.

16. The image display apparatus as claimed in claim 14, wherein the further single reflector is a single reflection prism sheet.

17. The image display apparatus as claimed in claim 1, the apparatus further comprising:
  a diffuser arranged to receive the image point rays from the source, and output diffuse image point rays;
  a retroreflective screen adjacent to the diffuser, and arranged to receive the diffuse image point rays from the diffuser, and output redirected image rays oriented towards the source.

18. The image display apparatus as claimed in claim 17, wherein the diffuser is additionally arranged to receive the redirected image rays from the retroreflective screen and produce twice diffused image rays oriented towards the source, wherein the collimating device is adjacent to the source of image point rays, and is arranged to receive the twice diffused image rays, and produce collimated image rays; and wherein the collimated image rays are directed towards the prism sheet.

19. The image display apparatus as claimed in claim 17, wherein the diffuser is an anisotropic diffuser sheet arranged to asymmetrically diffuse the image point rays;
  and wherein the diffuser sheet spreads the image point rays such that they cover a surface area of the collimating device.

20. A method for directing an image towards an observer, the method comprising:
  generating image point rays;
  collimating the image point rays to form collimated image rays;
  reflecting the collimated image rays twice from a prism sheet, the prism sheet comprising an array of micro-prisms; each micro-prism having two reflective facets;
  wherein reflecting the collimated image rays twice from a prism sheet comprises:
  reflecting the collimated image rays from a reflective facet of a first micro-prism; and,
  reflecting the collimated image rays from a reflective facet of an adjacent micro-prism, thereby reorienting the collimated image rays towards an image observation zone; and,
  wherein collimated image rays from an upper portion of the prism sheet converge with collimated image rays from a lower portion of the prism sheet within the image observation zone.

* * * * *